(12) United States Patent
Colling et al.

(10) Patent No.: US 6,384,374 B1
(45) Date of Patent: May 7, 2002

(54) SPARK GAP ASSEMBLY FOR A WELDING POWER SUPPLY

(75) Inventors: Ronald W. Colling, Kaukauna; Richard A. Duba, Appleton, both of WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/648,307

(22) Filed: Aug. 25, 2000

(51) Int. Cl.[7] .............................................. B23K 9/067
(52) U.S. Cl. .............................. 219/130.4; 313/231.41; 361/120
(58) Field of Search ........................... 219/130.4, 130.1, 219/137 PS; 361/120; 313/231.11, 231.41; 315/166, 246

(56) References Cited

U.S. PATENT DOCUMENTS

| | | | |
|---|---|---|---|
| 2,840,761 A | * | 6/1958 | Williams et al. ............ 315/166 |
| 2,886,737 A | | 5/1959 | Fruengel |
| 3,289,027 A | * | 11/1966 | Jones .................... 313/231.11 |
| 3,387,178 A | * | 6/1968 | Brundage ................... 315/246 |
| 3,459,996 A | * | 8/1969 | Adamson et al. ........ 219/130.4 |
| 4,104,558 A | | 8/1978 | Proud, Jr. et al. |
| 4,277,812 A | * | 7/1981 | Jones ......................... 361/120 |
| 4,879,452 A | | 11/1989 | Kovarik et al. |

* cited by examiner

Primary Examiner—Clifford C. Shaw
(74) Attorney, Agent, or Firm—Joseph W. Byrne

(57) ABSTRACT

A spark gap assembly for a welding power supply includes at least one pair of spark gap points and a housing base including at least one base groove for axially aligning the spark gap points. Point stops are disposed to retain some of the spark gap points in the spark gap assembly. Insulating walls and insulating channels are disposed to reduce the possibility of shorts occurring between various spark gap assembly components or between spark gap assembly components and other power supply components.

26 Claims, 7 Drawing Sheets

SPARK GAP ASSEMBLY FOR A WELDING POWER SUPPLY

FIELD OF THE INVENTION

The present invention relates generally to the art of welding power supplies having high frequency arc starters and/or stabilizers. More specifically, it relates to a spark gap assembly used to produce a high frequency signal in a welding, cutting or induction heating power supply.

BACKGROUND OF THE INVENTION

It is well known to superimpose a high frequency signal on an AC welding voltage to assist in arc starting and/or arc stabilization. This involves applying a high voltage, low current signal at a high frequency across the arc.

A high-frequency voltage signal can be used to initially ignite an AC or a DC welding arc. The main advantage of this technique is that arc ignition occurs when the welding electrode is brought near the workpiece. Actual contact between the electrode and the workpiece is not needed to start the arc when this technique is used.

A high frequency voltage signal can also be used to stabilize an AC welding arc. In the event of arc rectification (e.g. extinguishment), the high frequency signal provides a voltage sufficient to maintain or restart the arc. The high frequency voltage assures a re-ignition of the welding arc every time the AC welding voltage passes through a null, thereby stabilizing the arc. The high frequency overlay may be applied only upon start-up, continuously, or as needed. When applied as needed, arc rectification is sensed and, after rectification has existed for several cycles, the high frequency component is supplied.

A variety of devices have been developed to create the desired high frequency signal. For example, switches that provide momentary ignition pulses immediately after the AC welding voltage passes through a null point have been developed. These known devices typically use ignition condensers that discharge intermittently between the electrode and workpiece through a switch in the form of a spark gap.

A spark gap is created when two conductive spark gap points ("points") are held a fixed distance apart from each other. The spark actually arcs between two conductive spark gap surfaces, one on each point. Spark gap surface, as used herein, means the conductive surface of the spark gap point between which a spark arcs. Spark gap, as used herein, means the gap located between the spark gap surfaces across which the spark arcs.

A spark gap point or just point, as used herein, includes the spark gap surface and the rest of the body to which the spark gap surface is a part. Points are typically cylindrical in shape having a flat spark gap surface at one end. The present invention is not limited to cylindrical shaped spark gap points or flat spark gap surfaces, however, and other shapes can be used.

The assembly that holds the spark gap points in their proper position and orientation is called a spark gap assembly. A spark gap assembly, in addition to the spark gap points, can include a one or two piece plastic or ceramic housing, clamping members, heat sinks, electrical leads, retaining screws and other fasteners which hold together or hold in place the various components that make up the spark gap assembly.

One prior art spark gap assembly in common use for continuous duty cycle applications is shown in FIG. 1. Prior art assembly 100 includes four points 101, 102, 103, 104 mounted in four extruded aluminum heat sinks 105, 106, 107, 108. The points are located in holes 109, 110, 111, 112 (spark gap receptacles) in the heat sinks and are axially aligned with each other in pairs. Two points are in axial alignment with each other when their longitudinal axes are substantially aligned with each other (e.g. substantially the same axis). For points having flat spark gap surfaces at right angles to the point's longitudinal axis, this provides for a substantially uniform spark gap distance at all locations between the spark gap surfaces.

The points are secured in their respective spark gap receptacles using retaining screws 113, 114, 115, 116.

The retaining screws clamp the heat sinks together around the points. Retaining fastener (bolt, screw, studs, nuts, etc . . . ), as used herein, means a fastener that is used, directly or indirectly, to tightly secure a spark gap point in a spark gap receptacle.

A jumper wire 117 electrically connects one pair of points in series with the other pair of points. Jumper wire 117 is electrically connected to the points using two of the four retaining screws 113, 115. Likewise, each set of points is electrically wired to power supply circuitry (not shown) using the other two retaining screws 114, 116 which are also used to clamp heat sinks 106, 108 around points 102, 104.

Heat sinks 105, 106, 107, 108 are mounted on a square porcelain (ceramic) base 118. Each heat sink is secured to base 118 from below using a pair of metallic screws 119–122 (only one screw from each pair is shown in FIG. 1). These screws pass through mounting holes 123–126 in base 118. The screw heads are sunk into the bottom side of ceramic base 118 to help prevent shorting to the welding power supply chassis. Nonetheless, the prior art assembly is typically mounted in a power supply chassis with a layer of insulating paper placed between the bottom side 127 of porcelain base 118 and the power supply chassis. The insulating paper is used to further reduce the possibility of a short occurring between the spark gap assembly and the power supply chassis.

This prior art spark gap assembly suffers from several problems. First, this prior art assembly is typically mounted in the welding power supply with the points oriented in the vertical direction. As such, the bottom two spark gap points 101, 103 have a tendency to fall out when their retaining screws 113, 115 are loosened or removed. This can occur during routine maintenance. It can also occur as a result of either thermal cycling of the heat sinks or vibrations encountered during normal power supply usage. When a point falls out, it may be lost or it may come in contact with other electrical components inside of the power supply.

Another problem with this prior art assembly is that it cannot be completely assembled until it is installed in a welding power supply. This is because the electrical leads from the power supply are attached to assembly 100 using retaining screws 114, 116. These same screws are used to secure points 102, 104 in their receptacles. This means that the retaining screws holding two of the points in place cannot be adjusted and tightened until final installation in the welding power supply is completed.

Prior art spark gap assemblies, like the one described above, are used in continuous high frequency applications and have points that are completely surrounded by heat sinks. In other words, the receptacles are defined by the heat sinks. This type of arrangement has been used in the past to dissipate the heat that is generated during continuous high frequency applications. The heat sinks are mounted to an insulating base. As a result of this mounting scheme, the points in this prior art assembly are prone to misalignment.

Misalignment can occur at the time of assembly, during initial power supply installation, or over time. Misalignment occurring at the time of assembly is due to assembly error (e.g. improper alignment of heat sinks 105, 106, 107, 108 during initial assembly of spark gap assembly 100). This misalignment can be the result of tolerances in in mounting holes 123–126.

Misalignment can also result from the torque that is applied to heat sinks 106, 108 when electrical power supply leads are attached to spark gap assembly 100 via retaining screws 114, 116. This torque can cause heat sinks 106, 108 to rotate. The problem is worsened by the fact that the top surface of porcelain base 118 is an inherently slippery surface and heat sinks 105, 106, 107, 108 are prone to slide on that surface. Misalignment over time results when heat sink mounting screws 119–122 become loosened due to thermal cycling of the heat sinks or vibrations of the power supply during normal use.

Finally, this assembly requires the use of extra insulation to prevent shorts from occurring. As previously mentioned, insulating paper is typically used between ceramic base 118 and the power supply chassis. This insulating paper is also typically wrapped up around the sides of assembly 100 to protect the electrically conductive heat sinks from coming in contact with other power supply components or the power supply chassis.

A second prior art spark gap assembly that utilizes a single pair of spark gap points includes a pair of heat sinks mounted opposite each other along a longitudinal axis. The heat sinks are brass blocks and are mounted to a plastic housing base from below using metallic screws. For each brass block, the plastic base includes a pair of short raised ledges running perpendicular to the longitudinal axis, one on each side of each brass block. These ledges help prevent rotation of the brass blocks on the plastic base.

Each brass block includes a hole (spark gap receptacle) drilled longitudinally through its center for mounting a spark gap point therein. Each spark gap point is secured in its receptacle using a retaining screw (e.g. set screw in this case) that comes in perpendicularly from the top of the brass block.

This prior art spark gap assembly suffers from many of the same problems as the previous prior art assembly. To begin with, this prior art assembly is typically mounted in a welding power supply with the longitudinal axis running vertically. Thus, the spark gap point at the bottom of the assembly is prone to falling out if the retaining screw holding it in place is loosened during disassembly or during normal operation. In addition, the bare metallic screw heads on the bottom side of the housing are susceptible to shorting out to the power supply chassis.

Accordingly, a spark gap assembly that overcomes the problems with the prior art assemblies is desirable. Such an assembly preferably retains its points when its retaining screws are loosened or removed, can be completely assembled and adjusted prior to installation in a power supply and has all of its electrically conductive components insulated from the power supply chassis. Such an assembly also preferably provides for simple alignment of the points. Preferably, no initial adjustments will be necessary and alignment will be maintained throughout the life of the unit.

SUMMARY OF THE PRESENT INVENTION

According to a first aspect of the invention, a spark gap assembly for a welding power supply includes a first spark gap point, a second spark gap point, a housing base, a first base groove and a point stop. The first and second spark gap points define a first pair of spark gap points having a first spark gap there between. The first base groove is located on the housing base and is disposed to axially align the first and second spark gap points with each other. The first point stop is disposed to retain one of the first or second spark gap points in the spark gap assembly.

The first base groove is interrupted by an insulating channel disposed in the vicinity of the first spark gap in other embodiments. The first pair of spark gap points is located between a pair of insulating walls in another embodiment. The point stop is disposed on the housing base in yet another embodiment.

The spark gap assembly includes a first clamping member having a first complimentary groove in one embodiment. The first complimentary groove in combination with the first base groove define a first spark gap receptacle to hold the first spark gap point. The spark gap assembly includes a second clamping member having a second complimentary groove in an alternative embodiment. The second complimentary groove in combination with the first base groove define a second spark gap receptacle to hold the second spark gap point in this embodiment.

The first and second clamping members are one piece and the first and second complimentary grooves are a single groove interrupted by an insulating channel in another embodiment. The first and second clamping members are heat sinks in an alternative embodiment. The base includes a first pair of blind mounting holes disposed to mount the first clamping member in clamped relationship to the housing base and a second pair of blind mounting holes disposed to mount the second clamping member in clamped relationship to the housing base in yet another embodiment.

The spark gap assembly includes a third spark gap point, a fourth spark gap point, a second base groove and a second point stop in other embodiments. The third and fourth spark gap points define a second pair of spark gap points having a second spark gap there between. The second base groove is disposed on the housing base and axially aligns the third and fourth spark gap points with each other. The second point stop is disposed to retain one of the third or fourth spark gap points in the spark gap assembly in these embodiments.

The first base groove is interrupted by a first insulating channel disposed in the vicinity of the first spark gap and the second base groove is interrupted by a second insulating channel disposed in the vicinity of the second spark gap in alternative embodiments. In yet other embodiments, the first and second pair of spark gap points are located between a pair of insulating walls.

An insulating channel is disposed between the first and second base grooves in one embodiment. An insulating wall is located between the first and second pair of spark gap points in another embodiment. The first and second point stops are disposed on the housing base in yet another embodiment.

The spark gap assembly includes a third clamping member having a second complimentary groove in one embodiment. The third complimentary groove in combination with the second base groove define a third spark gap receptacle to hold the third spark gap point. The spark gap assembly includes a fourth clamping member having a fourth complimentary groove in another embodiment. The fourth complimentary groove in combination with the second base groove define a fourth spark gap receptacle to hold the fourth spark gap point in this embodiment.

The third and fourth clamping members are one piece and the third and fourth complimentary grooves are a single groove interrupted by an insulating channel in one embodiment. The third and fourth clamping members are heat sinks in an alternative embodiment.

According to a second aspect of the invention, a spark gap assembly for a welding power supply includes a first spark gap point, a second spark gap point, a housing base, a base groove, an insulating channel and a pair of insulating walls. The first and second spark gap points define a pair of spark gap points having a spark gap there between. The base groove is located on the housing base and is disposed to axially align the first and second spark gap points with each other. An insulating channel is disposed to interrupt the base groove in the vicinity of the spark gap. The pair of spark gap points are located between the pair of insulating walls.

According to a third aspect of the invention, a spark gap assembly includes a first spark gap point, a second spark gap point, a housing base, a first heat sink and a second heat sink. The first and second spark gap points define a pair of spark gap points having a spark gap there between. The housing base includes a base groove disposed to axially align the first and second spark gap points with each other. The first heat sink includes a first complimentary groove which in combination with the base groove define a first spark gap receptacle to hold the first spark gap point. Likewise, the second heat sink includes a second complimentary groove which in combination with the base groove define a second spark gap receptacle to hold the second spark gap point.

Figure 1:
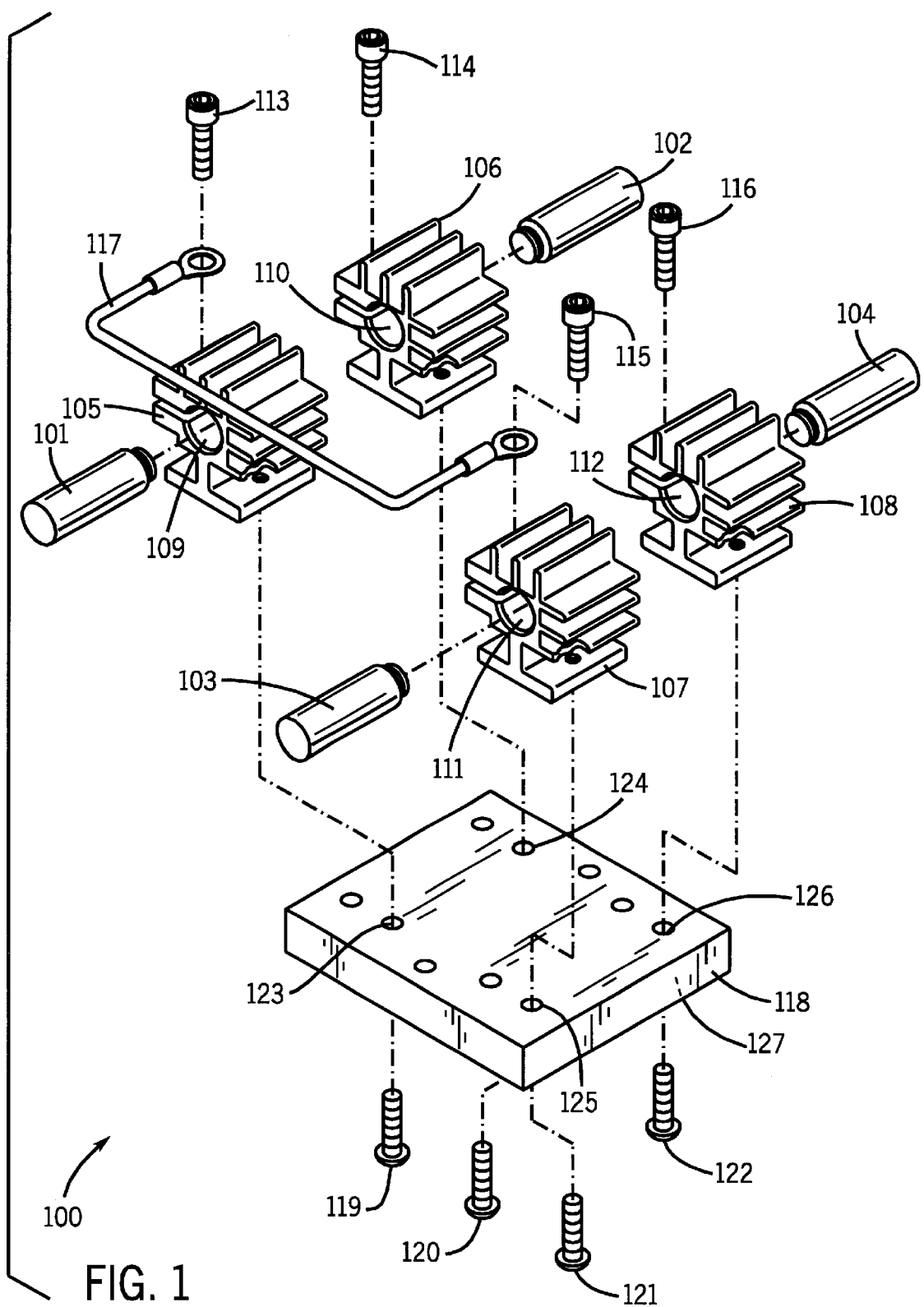
FIG. 1 is an exploded view of a prior art spark gap assembly.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular spark gap assembly having particular preferred features used in a welding environment, it should be understood at the outset that the invention can also be implemented with other particular features and can be used in other environments, including plasma cutting, induction heating, or other high power applications.

Figure 2:
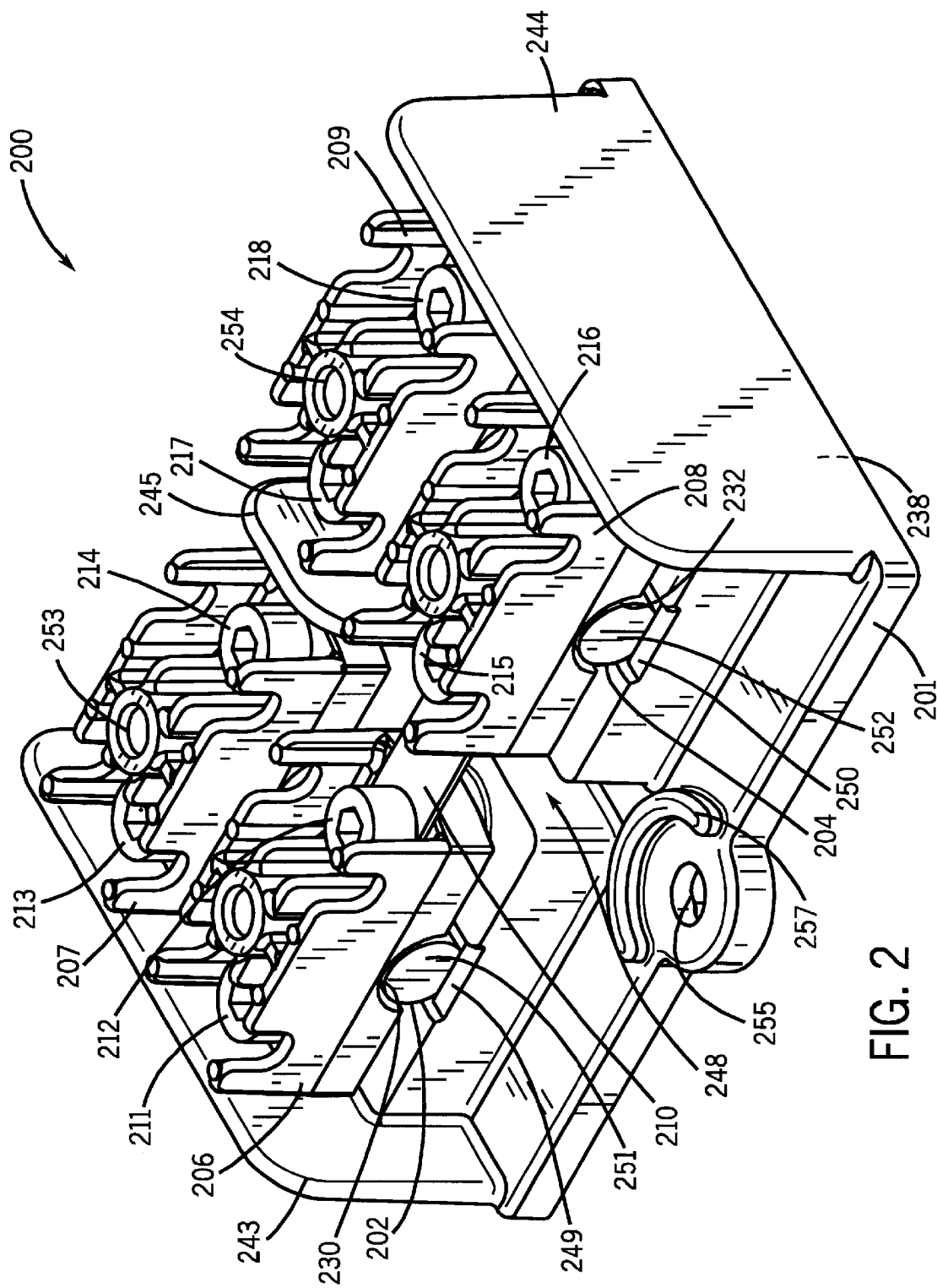
FIG. 2 is a perspective view of a spark gap assembly having two pairs of points in accordance with the present invention.
Figure 3:
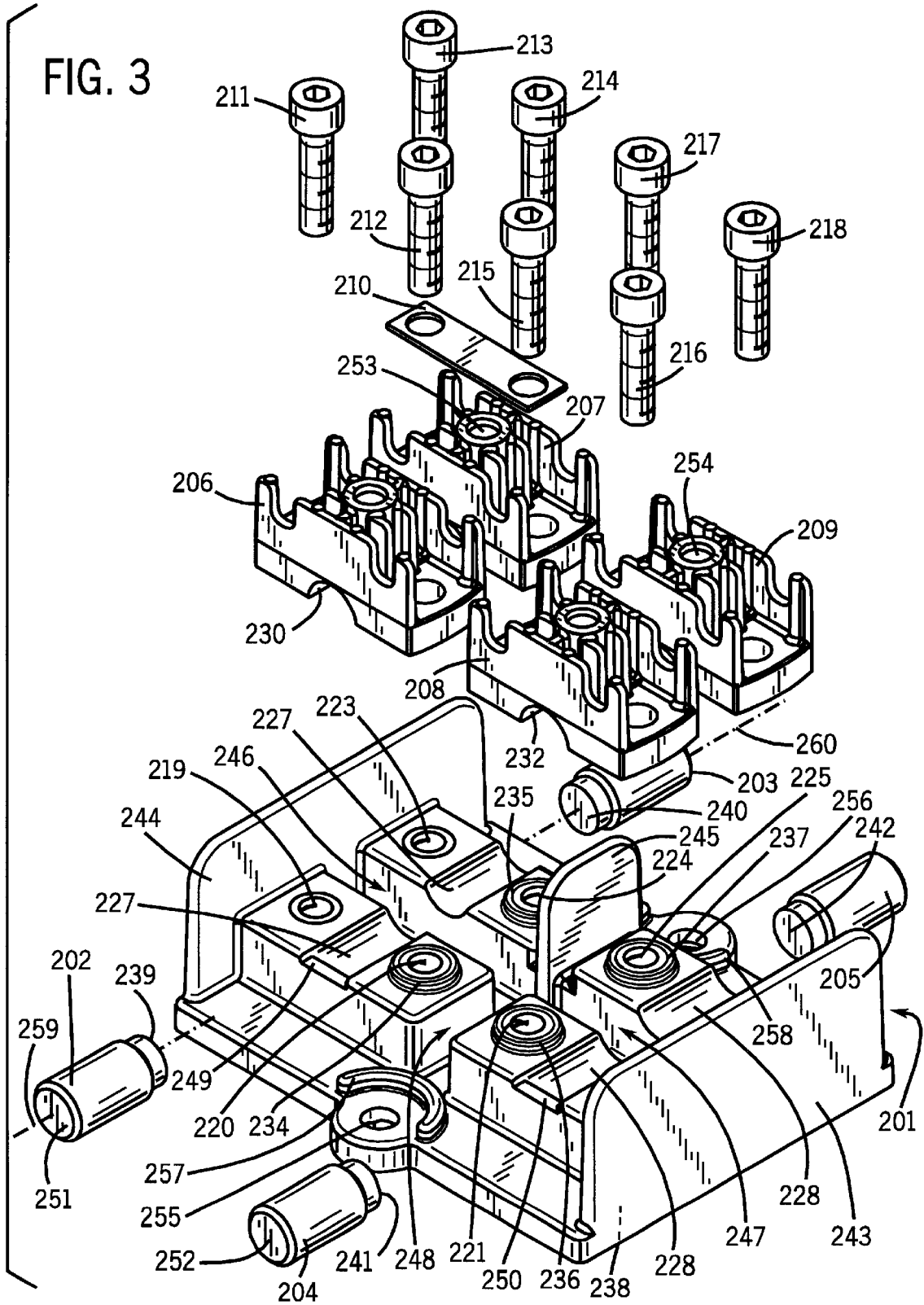
FIG. 3 is an exploded view of the spark gap assembly of FIG. 2.

FIG. 2 shows a perspective view of a spark gap assembly 200 according to the preferred embodiment of the present invention. Spark gap assembly 200 is shown in an exploded view in FIG. 3 and includes a housing base 201, a first pair of spark gap points 202, 203, and their accompanying clamping members 206, 207, a second pair of spark gap points 204, 205, and their accompanying clamping members 208, 209, and an electrical lead 210. Spark gap assembly 200 also includes a plurality of retaining bolts 211–218 and insulated (blind) holes 219–226. Retaining bolts 211–218 and holes 219–226 are used to mount clamping members 206, 207, 208, 209 to housing base 201 (thereby clamping points 202, 203 204, 205 in place).

Spark gap assembly 200 is used in continuous duty cycle applications. Clamping members 206, 207, 208, 209 are therefore heat sinks in this embodiment. These heat sinks aid in the dissipation of heat generated by spark gap assembly 200. It is not necessary, however, that heat sinks be used and any clamping member or structure capable of clamping a point in a spark gap receptacle can be used. In an alternative embodiment, for example, where heat dissipation is not a significant issue, clamping members 206, 207, 208, 209 are made of molded plastic. Clamping members 206 and 207 are made as one plastic piece and clamping members 208 and 209 are made as one plastic piece in an alternative embodiment. Clamping members 206, 207, 208, 209 are all made as a single plastic piece in yet another embodiment.

Figure 4:
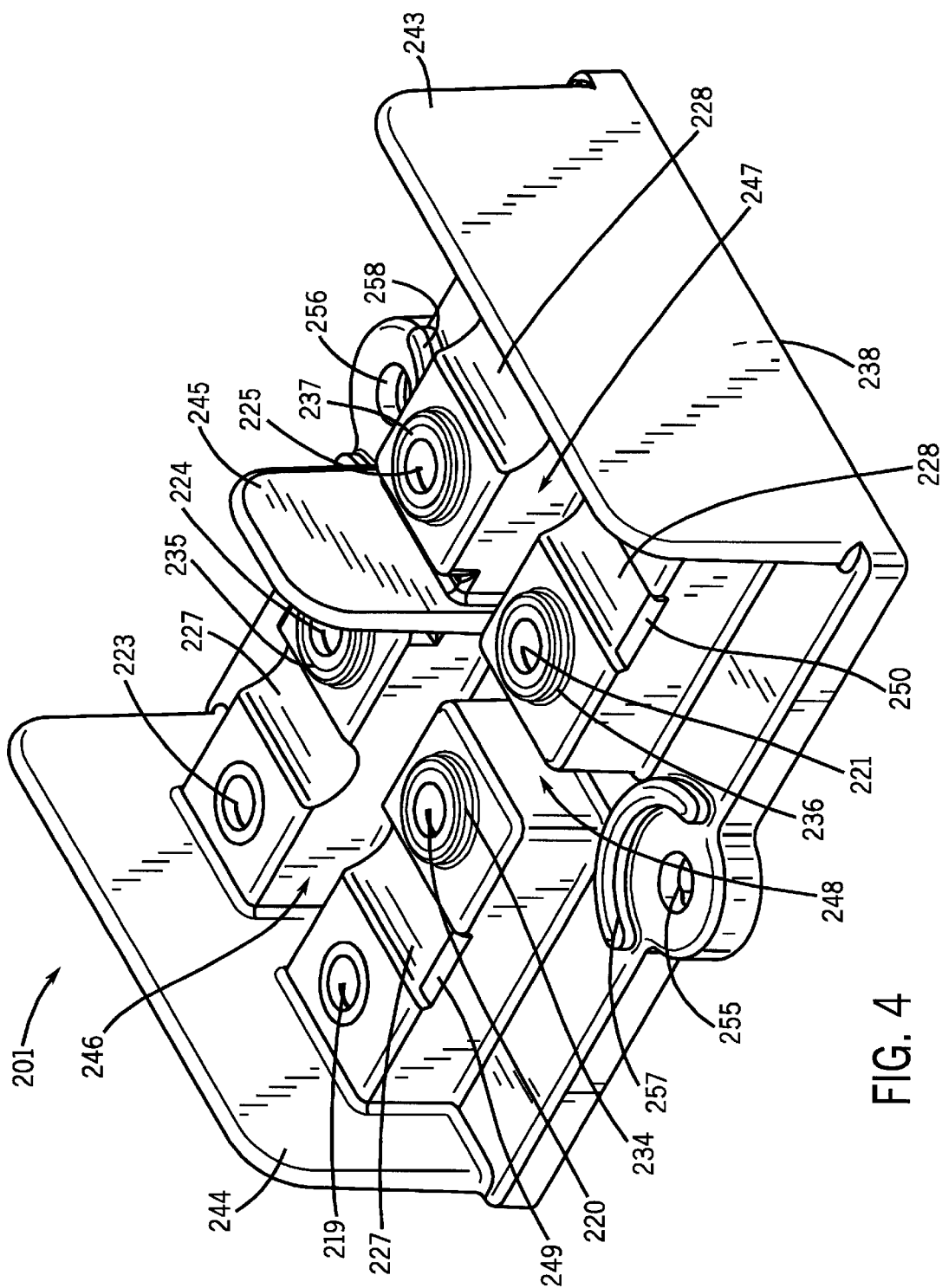
FIG. 4 is a perspective view of the housing base of the spark gap assembly of FIG. 2.
Figure 5:
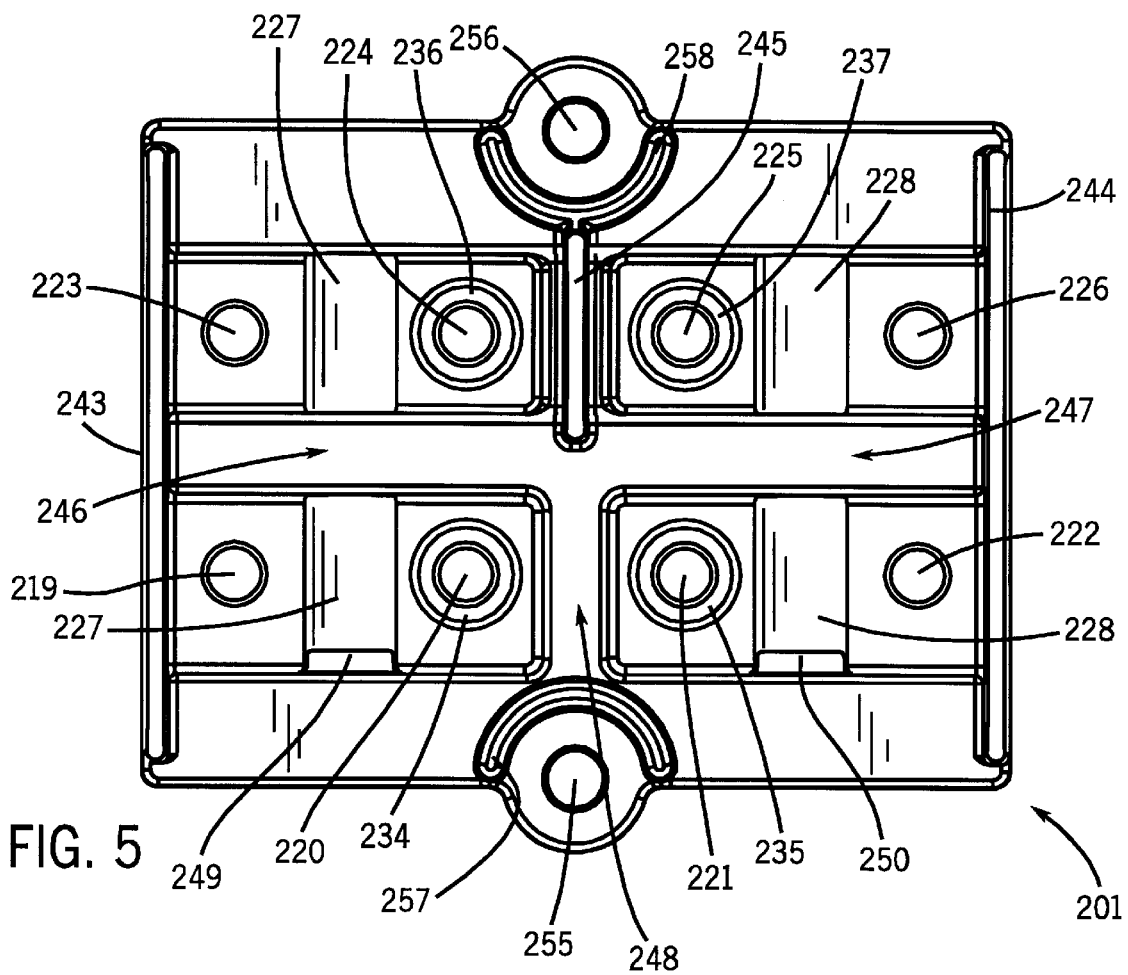
FIG. 5 is a top view of the housing base of FIG. 4.
Figure 6:
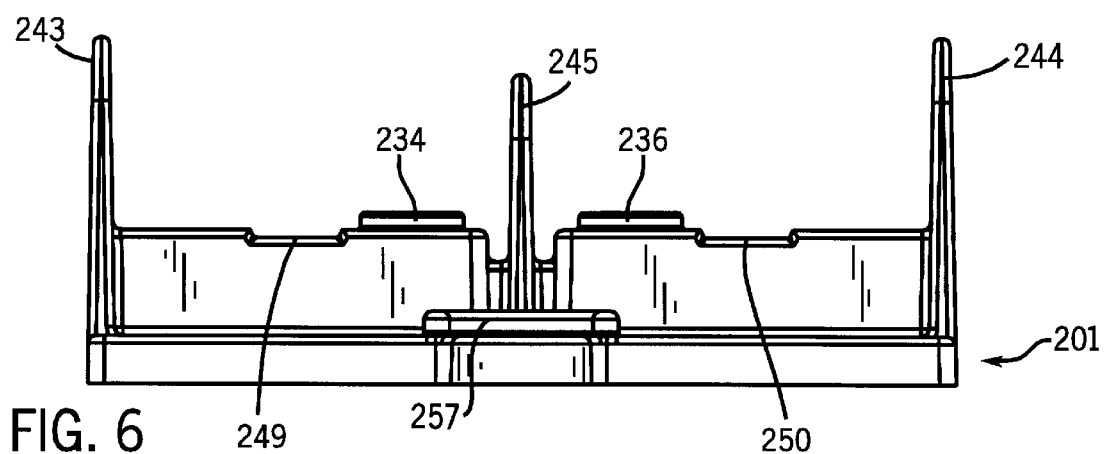
FIG. 6 is a end view of the housing base of FIG. 4.
Figure 7:
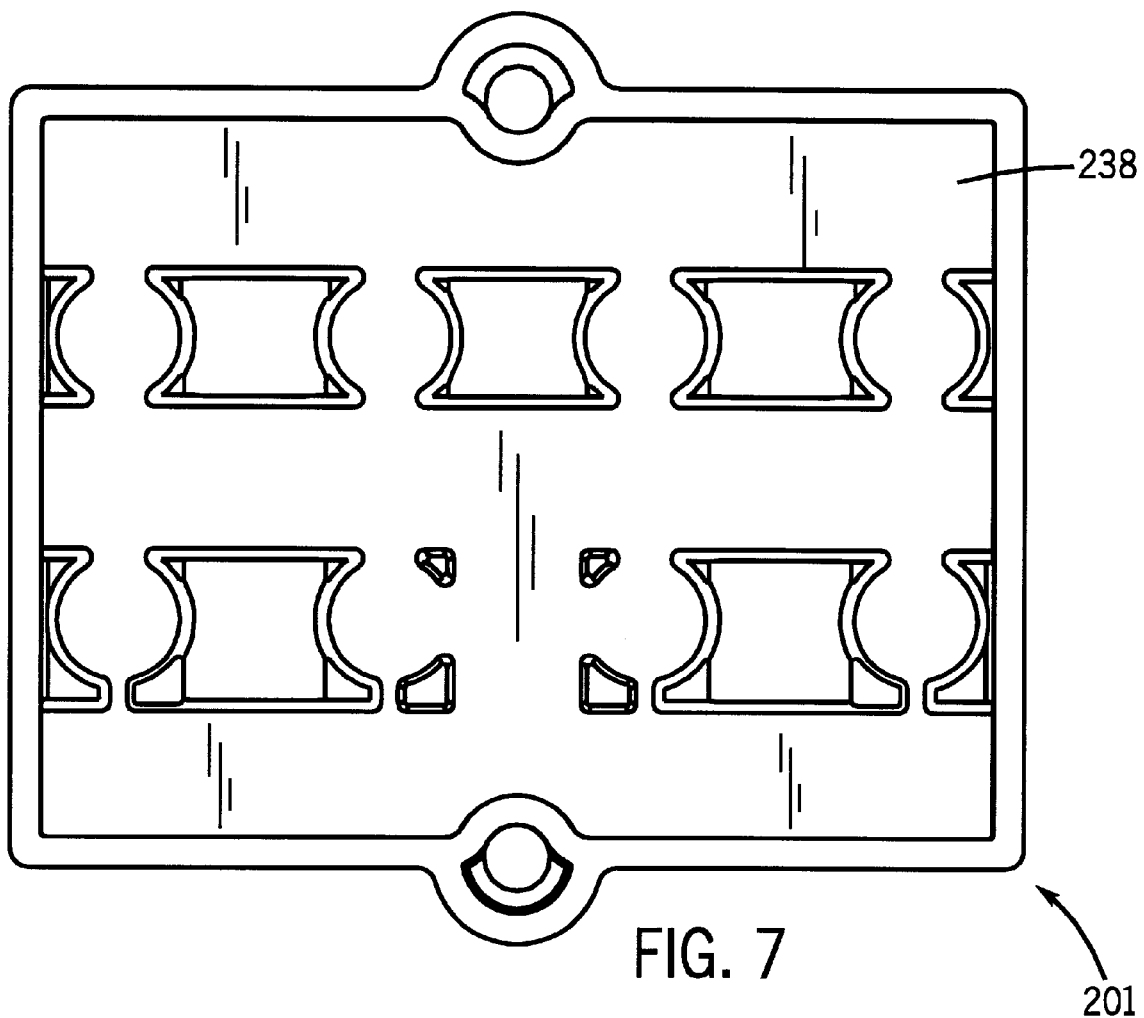
FIG. 7 is an bottom view of the housing base of FIG. 4.
Figure 8:
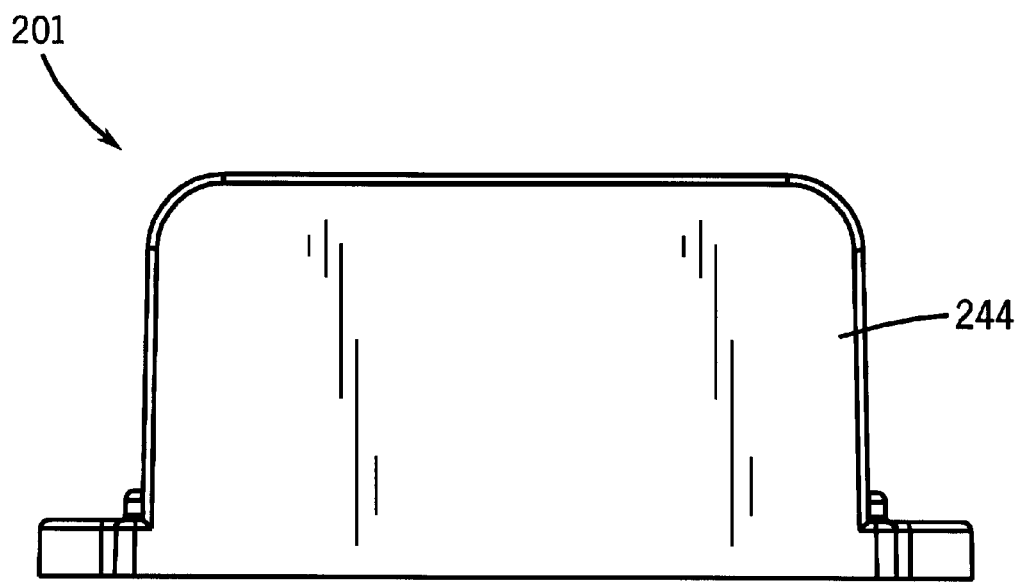
FIG. 8 is a side view of the housing base of FIG. 4.

Housing base 201 includes a pair of base grooves 227, 228 (see FIG. 4) which are molded into its top side in this embodiment. Housing base 201 is preferably made of a molded plastic but the invention is not limited to housing bases made of molded plastic and other insulative materials can be used. It is also not necessary that grooves 227, 228 be molded into housing base 201 and other techniques can be used to create grooves 227, 228.

Base groove 227 is configured to receive the first pair of spark gap points 202, 203 and to axially align those two points with each other (points 202, 203 have longitudinal axes 259, 260 in this embodiment). This provides for a substantially uniform spark gap distance at all locations between the spark gap surfaces 239 and 240 on points 202, 203.

Groove 228 is similarly configured to receive the second pair of spark gap points 204, 205 and to axially align those points with each other. Because grooves 227, 228 are permanently molded into the top side of housing 201, axial alignment between the points that make up each pair of points is achieved in a simple manner. No adjustments are required and alignment is maintained throughout the life of the spark gap assembly.

Clamping members 206, 207, 208, 209 each have a respective complimentary groove 230, 231, 232, and 233 on their bottom sides. These complimentary grooves are also configured to receive spark gap points 202, 203, 204, 205. Grooves 230, 231 on the bottom sides of clamping members 206, 207 are complimentary to base groove 227 in this embodiment. For example, groove 230, in combination with base groove 227, defines a cylindrical spark gap receptacle (see FIG. 2) for holding point 202. Groove 231, also in combination with base groove 227, defines a second cylindrical spark gap receptacle for holding point 203. A pair of spark gap receptacles are similarly defined by the combination of grooves 232, 233 with base groove 228. These two additional spark gap receptacles hold the second pair of points 204, 205.

Although particular shapes of grooves and spark gap receptacles are shown, the present invention is not limited to these shapes and other shapes can be used. For example, the grooves and spark gap receptacles are square or oval shaped in alternative embodiments. Likewise, the present invention is not limited to a receptacle that is made from a molded plastic base and a heat sink. The receptacle is made entirely from molded plastic (either one piece or two piece) in an alternative embodiment of the present invention.

In an alternative embodiment, wherein two or more clamping members are made of a single piece of electrically non-conductive material such as plastic, a single complimentary groove is provided to compliment each base groove. In this embodiment, for example, clamping members 206 and 207 are formed from a single piece of plastic material. A single complimentary groove is provided in the bottom of the single piece of plastic and replaces complimentary grooves 230 and 231. This complimentary groove, in combination with base groove 227, forms a pair of spark gap receptacles for holding points 202, 203 in place. An insulating channel as described more fully below interrupts the single complimentary channel in the vicinity of the spark gap in another embodiment.

Spark gap points 202, 203, 204, 205 are secured in place in their respective receptacles by the clamping action of their respective heat sinks (clamping members) 206, 207, 208, 209 with housing base 201. For example, heat sink 206 is secured to housing base 201 using retaining bolts 211, 212 which are threaded into holes 219, 220. Tightening bolts 211, 212 causes heat sink 206 to clamp down on spark gap 202 thereby securing spark gap 202 in place in its receptacle. The other three spark gap points 203, 204, 205 are secured in place in a similar manner.

To help insure that each spark gap point is properly clamped by its respective heat sink clamp, bosses 234, 235, 236, 237 are provided around the top edge of each inside blind hole 220, 221, 224, 225. These bosses help prevent one side of each heat sink clamp from being over-tightened prior to the tightening of the other side of each heat sink clamp.

As an example of how these bosses are used, heat sink 206 is first placed over spark gap point 202. Inside retaining bolt 212 is inserted into blind hole 220 and is tightened completely. This secures the bottom edge of heat sink 206 against boss 234. Finally, retaining bolt 211 is inserted in hole 219 and tightened, thereby securing spark gap 202 in place. The other three heat sinks 207, 208, 209 are attached in the same manner.

Retaining bolts 211–218 are introduced from the top side of housing base 201 in the preferred embodiment. In an alternative embodiment, the retaining fasteners are introduced from the bottom side of housing base 201. Holes 219–226 are blind holes with insert molded threads in this embodiment. Blind holes (or insulated holes), as used herein, are holes that do not go entirely through the housing base to the bottom side (e.g. the side that mounts to or faces the power supply chassis when the spark gap assembly is mounted in the power supply) of the spark gap assembly. Retaining screws 211–218 are therefore insulated from the bottom side 238 of housing base 201 and no additional insulation is needed between bottom side 238 of spark gap assembly 200 and the power supply chassis.

Although the preferred embodiment is illustrated using threaded bolts and holes to clamp down on points 202, 203, 204, 205, the present invention is not limited to these types of retaining fasteners. In one alternative embodiment, threaded studs (e.g. insert molded into the housing base) and nuts are used to secure the clamping members to the housing base and thereby clamp the points in place. In other embodiments, screws are used. Likewise, holes that go all the way through the housing base (non-blind holes) are used and the retaining fastener are introduced from the bottom side of the spark gap assembly in another alternative embodiment.

With points 202, 203, 204, 205 securely held in place in spark gap assembly 200, a spark gap on the order of 0.008–0.012 inches is typically provided by each pair of points. For the first pair of points, this gap is defined by the distance between spark gap surface 239 on spark gap point 202 and spark gap surface 240 on spark gap point 203. Similarly, for the second pair of points 204, 205, this gap is defined by the distance between spark gap surface 241 on spark gap point 204 and spark gap surface 242 on spark gap point 205.

Each pair of points is electrically connected in series using electrical lead 210. Lead 210 is electrically connected to the pairs of points indirectly through electrically conductive heat sinks 206, 208. Electrical lead 210 is connected directly to the pairs of points (e.g. using a set screw) in an alternative embodiment where the clamping members are made of plastic. Retaining bolts 212, 215 are used to secure lead 210 in place.

Spark gap assembly 200 is electrically connected to a power supply using two self tapping screws (not shown) inserted into self tapping holes 253, 254 on heat sinks 207, 209. The sole purpose for holes 253, 254 is to connect spark gap assembly 200 to a power supply. As a result, spark gap assembly 200 can be completely assembled for later installation into a power supply using holes 253, 254. The power supply is connected directly to the points (e.g. using a set screw) in an alternative embodiment where the clamping members are made of plastic.

Spark gap assembly 200 also includes a pair of insulating walls 243, 244. Insulating walls 243, 244 are located on either side of spark gap assembly 200 in this embodiment. These walls help in preventing a short between the electrically conductive portions of spark gap assembly 200, which are all contained inside of insulating walls 243, 244, and the metal chassis of the welding power supply, In addition to outside insulating walls 243, 244, a third insulating wall 245 is provided between points 203 and 205. In an alternative embodiment, insulating wall 245 extends all the way between points 202, 203 and points 204, 205. Insulating wall 245 is provided to reduce the likelihood of a short occurring between points 203 and 205. This type of short can occur as the result of metallic dust that builds up over time on spark gap assembly 200.

Insulating wall, as used herein, means any electrically non-conductive wall-like structure that shields electrically conductive components of the spark gap assembly from each other or from electrically conductive portions of the power supply chassis. Insulating walls 243, 244, and 245 extend upward above points 202, 203, 204, 205 in one embodiment. In alternative embodiments, one or more of the insulating walls do not extend above the points. In other alternative embodiments, only a single outside insulating wall is provided or only an inside insulating wall between the pairs of points is provided.

Another insulating technique that is used to reduce shorts between various components of spark gap assembly 200 involves the use of insulating channels. Insulating channel, as used herein, means any electrically non-conductive channel-like structure that runs near or between the electrically conductive components of the spark gap assembly.

Insulating channels 246, 247 are provided just below each spark gap. Channels 246, 247 interrupt grooves 227, 228 and are provided to reduce the likelihood that a short will occur between the two points that make up a point pair. Shorts can happen, for instance, when metallic dust builds up under the spark gaps over time. Another insulating channel 248 is provided between points 202 and 204. In an alternative embodiment, insulating channel 248 extends all the way between points 202, 203 and points 204, 205.

Spark assembly 200 is typically mounted in a welding power supply with its pairs of points oriented in the vertical direction. As an aid in preventing points 202 and 204 from falling out of assembly 200 when retaining bolts 211, 212, 215, 216 are loosened, point stops 249, 250 are provided. These point stops are molded into housing base 201 in this embodiment and abut the ends 251, 252 of points 202 and 204. In alternative embodiments, the point stops are mounted on another component other than the base such as on a clamping member.

Point stop, as used herein, means any member or structure that prevents a point from falling out of its receptacle (e.g. retains the point in its receptacle) when its retaining fastener becomes loosened. Retaining fasteners are distinguished from point stops in that retaining fasteners are used to tightly secure points in their receptacles whereas point stops are used to retain points in their receptacles when the retaining fasteners are loosened for some reason.

Assembly of spark gap assembly 200 will now be described briefly. Points 202 and 204 are first placed into their respective base grooves 227, 228 with gap surfaces 239 and 241 facing inward and with ends 251, 252 abutting point stops 249, 250. Heat sinks 206, 208 are next placed over points 202, 204. Electrical lead 210 is placed between heat sinks 206, 208. Retaining bolts 212 and 215 are inserted through holes in electrical lead 210 to secure it to heat sinks 206, 208. Inside retaining bolts 212, 215 are then tightened into inside blind holes 220, 221. Finally, outside retaining bolts 211, 216 are inserted and tightened and this secures points 202, 204 in their respective receptacles.

Heat sinks 207, 209 are now loosely mounted onto housing base 201 using retaining bolts 213, 214, 217, 218. Points 203, 205 are inserted into their respective receptacles with spark gap surfaces 240, 242 facing inward opposite spark gap surfaces 239, 241. A feeler gauge is used to set the desired spark gap distance between each pair of spark gap surfaces. Once the spark gap distance is set, heat sinks 207 and 209 are secured to housing base 201 using the procedure previously described. Spark gap assembly 200 is now completely assembled and ready for installation into a power supply.

Installation into a power supply is accomplished by simply connecting the power supply leads to the spark gap assembly using two self tapping screws (not shown). As previously mentioned, the self tapping screws mount into self tapping holes 253, 254 in the top of heat sinks 207, 209. There is no need to loosen any of the points to install spark gap assembly 200 into a power supply and therefore spark gap assembly 200 can be completely assembled prior to any installation.

The final installation step is to mount spark gap assembly 200 to the power supply chassis. This is accomplished by inserting two mounting rivets or bolts (not shown) through mounting holes 255, 256 in housing base 201. Mounting holes 255, 256 are each surrounded by an inside lip 257, 258. Lips 257, 258 are provided to reduce the likelihood of a short occurring between the power supply chassis and spark gap assembly 200.

Figure 9:
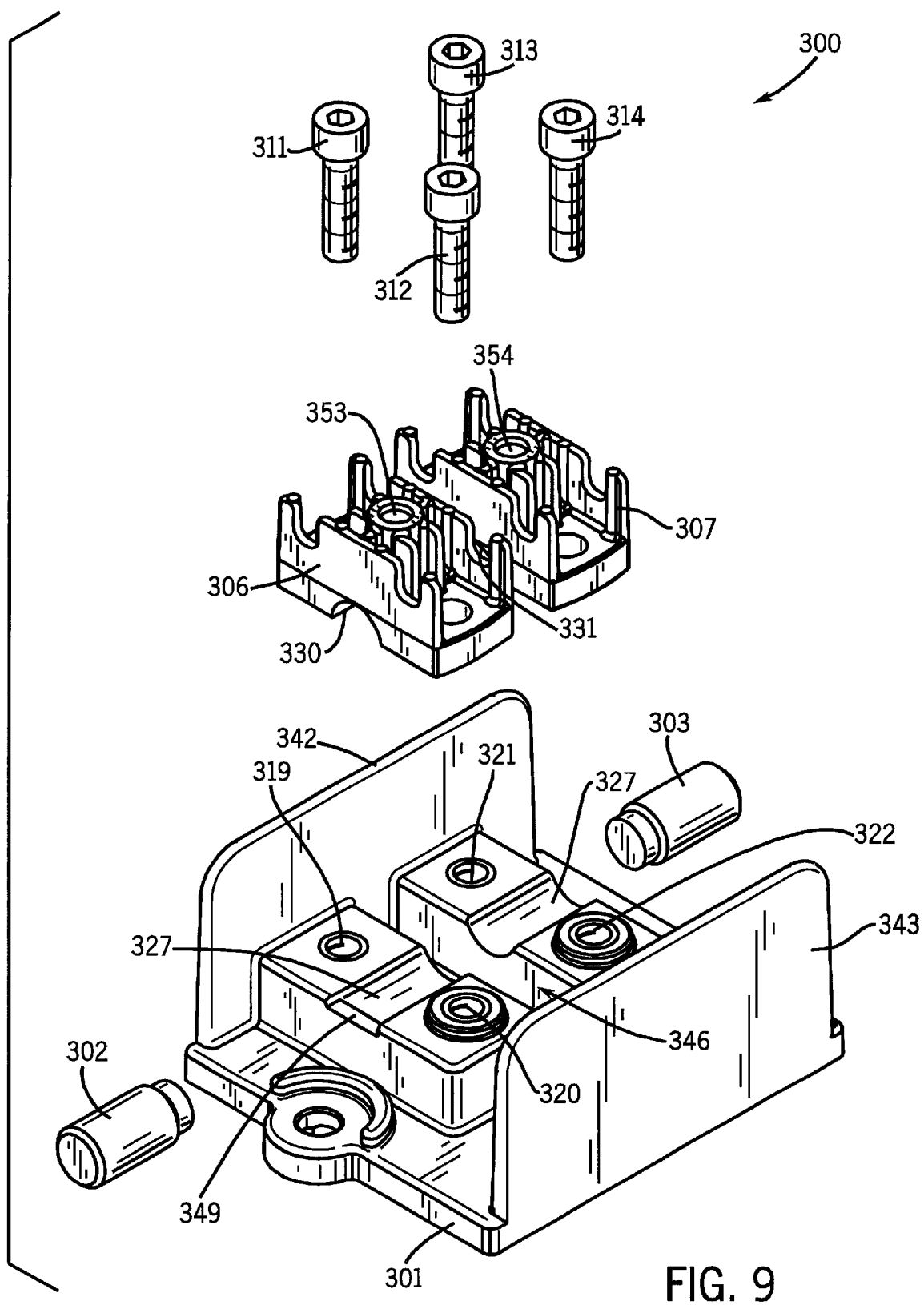
FIG. 9 is a perspective view of a spark gap assembly having one pair of points in accordance with the present invention.

The present invention has been illustrated with a spark gap assembly having two pairs of points connected in series. The present invention is not limited to assemblies having four points however. FIG. 9 shows an alternative embodiment of the present invention having only a single pair of points.

The embodiment of FIG. 9 is similar to the embodiment shown in FIG. 2 and therefore neither its construction nor its operation will be described in great detail. Spark gap assembly 300 includes a housing base 301, a pair of points 302, 303, a pair of clamping members 306, 307, four retaining bolts 311–314 and four blind mounting holes 319–322.

Housing base 301 has a single base groove 327 for axially aligning points 302, 303. Clamping members 306, 307 have complimentary grooves 330, 331 that in combination with groove 327 form a pair of spark gap receptacles for holding points 302, 303. Spark gap assembly 300 also includes a Ad pair of outside insulating walls 343, 344 that protect spark gap assembly 300 from shorting to the power supply and an insulating channel 346 that interrupts base groove 327 to prevent shorting between points 302, 303.

Spark gap assembly 300 also includes a point stop 349 for retaining point 302 when retaining bolts 311, 312 are loosened or removed. The electrical leads from the power supply are connected to spark gap assembly 300 using two self tapping screws (not shown) mounted in self tapping holes 353, 354 on heat sinks 306, 307.

Numerous modifications may be made to the present invention which still fall within the intended scope hereof. Thus, it should be apparent that there has been provided in accordance with the present invention a spark gap assembly that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A spark gap assembly for a welding power supply comprising:
   a first spark gap point;
   a second spark gap point, wherein the first and second spark gap points define a first pair of spark gap points having a first spark gap there between;
   a housing base;
   a first base groove on the housing base disposed to axially align the first and second spark gap points with each other; and
   a first point stop disposed to retain one of the first or second spark gap points in the spark gap assembly.

2. The spark gap assembly of claim 1 wherein the first base groove is interrupted by an insulating channel disposed in the vicinity of the first spark gap.

3. The spark gap assembly of claim 1 further including a pair of insulating walls, wherein the first pair of spark gap points is located between the pair of insulating walls.

4. The spark gap assembly of claim 1 wherein the point stop is disposed on the housing base.

5. The spark gap assembly of claim 1 further including a first clamping member having a first complimentary groove, wherein the first complimentary groove in combination with the first base groove defines a first spark gap receptacle to hold the first spark gap point.

6. The spark gap assembly of claim 5 further including a second clamping member having a second complimentary groove, wherein the second complimentary groove in combination with the first base groove defines a second spark gap receptacle to hold the second spark gap point.

7. The spark gap assembly of claim 6 wherein the first and second clamping members are one piece and further wherein the first and second complimentary grooves are a single groove interrupted by an insulating channel.

8. The spark gap assembly of claim 6 wherein the first and second clamping members are heat sinks.

9. The spark gap assembly of claim 6 wherein the base includes a first pair of blind mounting holes disposed to mount the first clamping member in clamped relationship to the housing base and a second pair of blind mounting holes disposed to mount the second clamping member in clamped relationship to the housing base.

10. The spark gap assembly of claim 6 wherein the first base groove is interrupted by an insulating channel disposed in the vicinity of the first spark gap.

11. The spark gap assembly of claim 6 further comprising:
a third spark gap point;
a fourth spark gap point, wherein the third and fourth spark gap points define a second pair of spark gap points having a second spark gap there between;
a second base groove on the housing base disposed to axially align the third and fourth spark gap points with each other; and
a second point stop disposed to retain one of the third or fourth spark gap points in the spark gap assembly.

12. The spark gap assembly of claim 11 wherein the first base groove is interrupted by a first insulating channel disposed in the vicinity of the first spark gap and the second base groove is interrupted by a second insulating channel disposed in the vicinity of the second spark gap.

13. The spark gap assembly of claim 11 wherein the housing base further includes an insulating channel disposed between the first and second base groves.

14. The spark gap assembly of claim 11 further including a pair of insulating walls, wherein the first and second pair of spark gap points are located between the pair of insulating walls.

15. The spark gap assembly of claim 11 further including an insulating wall located between the first and second pair of spark gap points.

16. The spark gap assembly of claim 11 further including a third clamping member having a third complimentary groove, wherein the third complimentary groove in combination with the second base groove defines a third spark gap receptacle to hold the third spark gap point.

17. The spark gap assembly of claim 16 further including a fourth clamping member having a fourth complimentary groove, wherein the fourth complimentary groove in combination with the second base groove defines a fourth spark gap receptacle to hold the fourth spark gap point.

18. The spark gap assembly of claim 17 wherein the third and fourth clamping members are one piece and further wherein the third and fourth complimentary grooves are a single groove interrupted by an insulating channel.

19. The spark gap assembly of claim 17 wherein the third and fourth clamping members are heat sinks.

20. The spark gap assembly of claim 1 further comprising:
a third spark gap point;
a fourth spark gap point, wherein the third and fourth spark gap points define a second pair of spark gap points having a second spark gap there between;
a second base groove on the housing base disposed to axially align the third and fourth spark gap points with each other; and
a second point stop disposed to retain one of the third or fourth spark gap points in the spark gap assembly.

21. The spark gap assembly of claim 20 wherein the first base groove is interrupted by a first insulating channel disposed in the vicinity of the first spark gap and the second base groove is interrupted by a second insulating channel disposed in the vicinity of the second spark gap.

22. The spark gap assembly of claim 20 further including a pair of insulating walls, wherein the first and second pair of spark gap points are located between the pair of insulating walls.

23. The spark gap assembly of claim 20 further including an insulating wall located between the first and second pair of spark gap points.

24. The spark gap assembly of claim 20 wherein the first and second point stops are disposed on the housing base.

25. A spark gap assembly for a welding power supply comprising:
a first spark gap point;
a second spark gap point, wherein the first and second spark gap points define a pair of spark gap points having a spark gap there between;
a housing base;
a base groove on the housing base disposed to axially align the first and second spark gap points with each other;
an insulating channel disposed to interrupt the base groove in the vicinity of the spark gap; and
a pair of insulating walls, wherein the pair of spark gap points are located between the pair of insulating walls.

26. A spark gap assembly for a welding power supply comprising:
a first spark gap point;
a second spark gap point, wherein the first and second spark gap points define a pair of spark gap points having a spark gap there between;
a housing base;
a base groove on the housing base disposed to axially align the first and second spark gap points with each other;
a first heat sink having a first complimentary groove, wherein the first complimentary groove in combination with the base groove defines a first spark gap receptacle to hold the first spark gap point; and
a second heat sink having a second complimentary groove, wherein the second complimentary groove in combination with the base groove defines a second spark gap receptacle to hold the second spark gap point.

* * * * *